Figure 1:
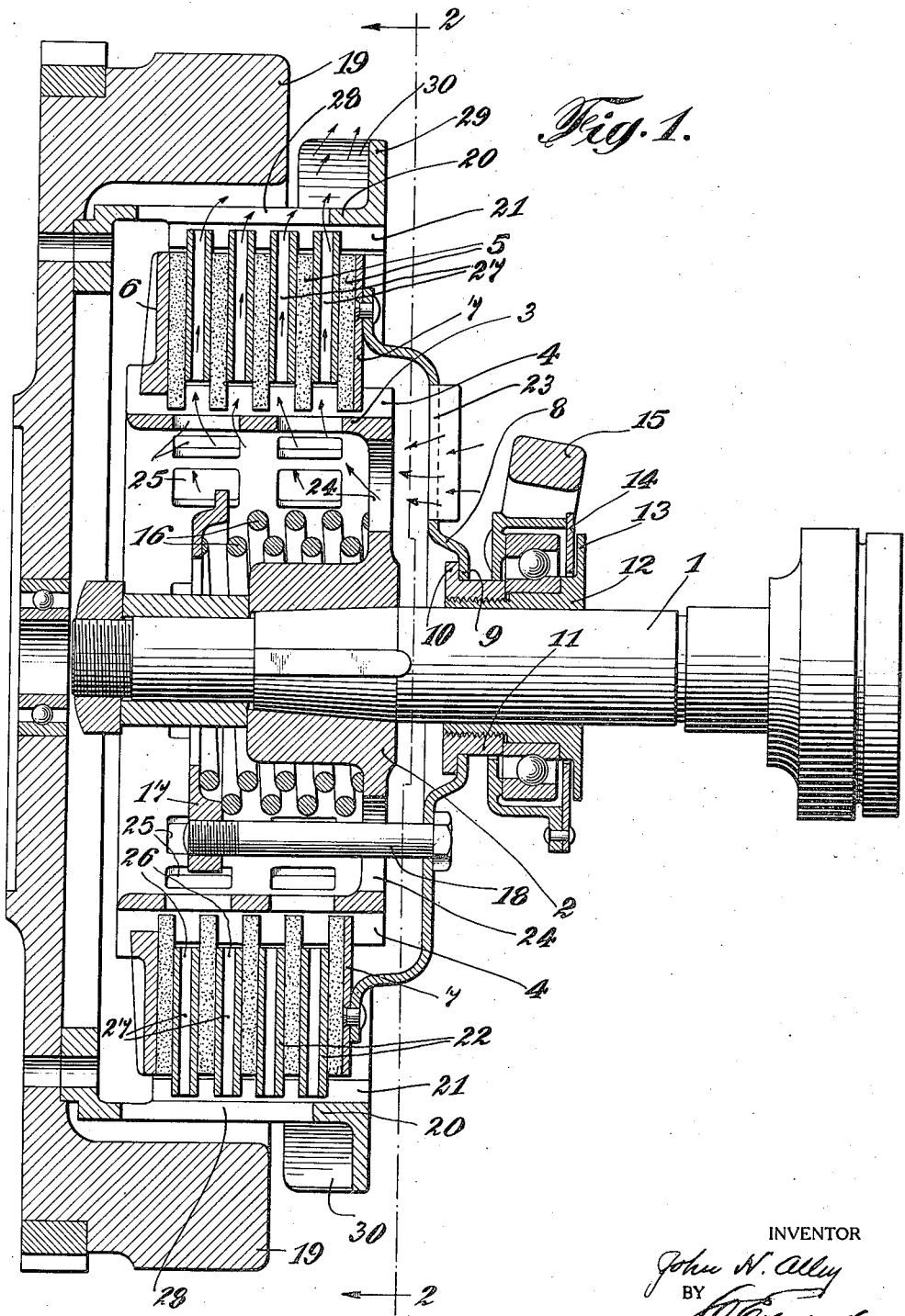

July 12, 1927.

J. H. ALLEY 1,635,353

AIR COOLED CLUTCH

Filed Sept. 30, 1925

2 Sheets-Sheet 1

INVENTOR
John H. Alley
BY
ATTORNEY

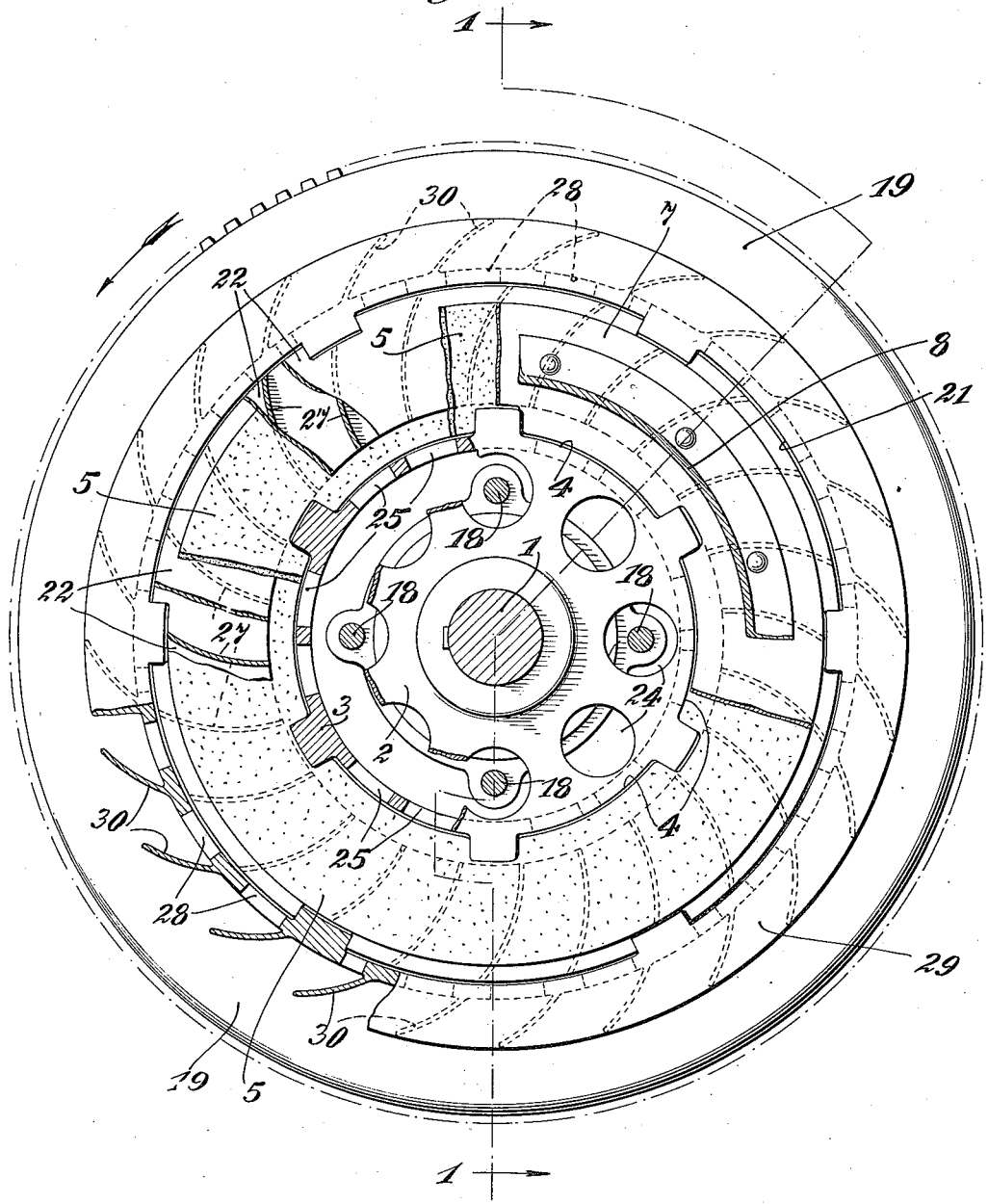

Patented July 12, 1927.

1,635,353

UNITED STATES PATENT OFFICE.

JOHN H. ALLEY, OF PHILADELPHIA, PENNSYLVANIA, ASSIGNOR TO THE AMERICAN MOTOR BODY CORPORATION, OF PHILADELPHIA, PENNSYLVANIA, A CORPORATION OF DELAWARE.

AIR-COOLED CLUTCH.

Application filed September 30, 1925. Serial No. 59,443.

This invention relates to clutches, and more particularly relates to a clutch which is automatically air cooled during its rotation, and the principal object of my invention is to provide a clutch having this characteristic without detracting from the strength, durability and simplicity thereof. Other objects of my invention will be in part obvious and in part pointed out hereinafter.

It is a well known physical principle that due to friction between two sliding surfaces, mechanical energy is converted into heat, which results in an increase in temperature of the parts involved. Motor vehicle friction clutches are very much subject to this condition during the starting and change gear periods of operation, and frequently comparatively large quantities of mechanical energy are converted into heat, which must be dissipated in some manner in order to prevent excessively high and destructive temperatures. In very severe service, such as the clutch is subjected to in city bus operation, where starts are quite frequent, temperatures often become so high that metallic friction plates become grooved and warped while the fibrous friction material chars, crumbles, and consequently fails.

In view of these conditions and failings, I have provided a ventilated or air cooled clutch of the dry plate type, the method of cooling being not unlike that of an air cooled internal combustion engine. The working principle is as follows: Air, having weight and inertia, can readily be thrown off at a tangent by centrifugal force. Having this in mind, I provide the metal plates with some form of hollow spaces between the friction surfaces so that the air may pass through freely from the center to the outside circumference. These spaces may be holes drilled edgewise or cored hollow passages, extending radially, or tangent to an arbitrary concentric circle. If the latter, the partitioning webs between the air passages may be straight or curved with a radius best determined by experiment.

In order to provide for the free entrance and exit of the air, the drum or driving cylinder is constructed with sufficient radial openings. The driven drum is constructed similarly and in addition has axial openings in the web. Furthermore, in order to induce a strong draught and cause a large quantity of air per unit of time to pass through, a form of fan is built around the aforementioned drum or driving cylinder. This will aid quite materially in keeping the temperature within a safe limit.

In order that a clearer understanding of my invention may be had, attention is hereby directed to the accompanying drawings forming a part of this application and illustrating one certain embodiment of my invention. Referring to the drawings, Fig. 1 is a sectional view of a clutch embodying my invention and is taken approximately on the line 1—1 of Fig. 2; and Fig. 2 is an end view of the clutch partly in section and is taken on the line 2—2 of Fig. 1. Similar reference characters refer to similar parts throughout the several views of the drawings.

Referring to the drawings, the driven shaft 1 has keyed thereto the hub 2 of a drum 3, the web or flange of which is provided with grooves 4, in which are slidably guided the inner edges of friction rings 5 of suitable material, preferably fibrous. The drum at one side has an annular wall 6 forming an abutment against which the clutch members are compressed. At the other side of the drum is a ring 7 which is secured to a spider or disc 8. Disc 8 has a central perforation and its edge 9 adjacent this opening engages behind an annular shoulder 10 provided on a collar 11 which is threaded to a sleeve 12. Sleeve 12 is slidably mounted on shaft 1 and has an annular flange 13 constituting an abutment for the annular clutch operating collar or yoke 14 which is arranged to be moved lengthwise of shaft 1 in the conventional manner, as by operating knuckle 15. The conventional coiled springs 16 are compressed between the clutch drum 3 and an annular disc 17 which is supported by being engaged by the threaded ends of screw bolts 18 which extend through and have their heads on the outside of disc 8. The driving member 19 is provided with an annular web or flange 20 provided with the conventional grooves 21 and with clutch rings 22 slidably retained in these grooves.

The construction so far described is conventional and forms no part of my invention, and the operation is believed to require no further description.

The disc or spider 8 is provided with a plurality of apertures 23. The driven clutch drum 3 is hollow and its side wall is provided with openings 24. Its web has openings 25 leading into the grooves 4. The rigid clutch rings 22 have perforations or passages 26 leading from the inner to the outer peripheries of these rings and communicating with grooves 4 and 21. These passages 26 are formed circumferentially between the side surfaces of each ring. Although, if desired, straight radial partition walls or webs may separate adjacent passages, these partitions 27 preferably have the curvature of the fan blades. By reason of such curvature of the partition members 27, these partition members will function as fan blades to drive air through the passages 26 from the inner to the outer peripheries of these discs 22. The driving drum surface 20 has perforations 28 therethrough. This drum is provided with a peripheral edge flange 29 and with fan blades 30 of the rearwardly curving type disposed on the outer surface of member 20 and against the rear surface of flange 29.

The arrangement is such that when the driving drum rotates, the fan blades 30 will suck air through apertures 23 and 24 into the hollow of drum 3, whence the air will be taken through apertures 25 into the grooves 4 surrounding the inner edges of the clutch rings, thence through the apertures 26 within the clutch discs 22, thence into the passages or grooves 21 at the outer peripheries of these discs, thence through the apertures 28 in drum surface 20, and so out into the surrounding atmosphere. The fan blade formation of partitions 27 enhances this air flow.

From the above it will be apparent that in accordance with my invention there is provided free and complete forced circulation of air through the clutch at all times, and in particular through the friction rings 22, these being the parts which are subjected to the greatest heating effect. After passing through the members 22 to cool the same, the air is carried away and dissipated into the atmosphere rapidly. In this manner the temperature of the friction plates 22 is kept down and danger of overheating is eliminated. There is thus insured a positive flow of large quantities of air through the parts that are subjected to highest temperature.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. A clutch construction of the character described, including a driving drum, a co-axial driven drum, an assembly of friction clutch rings intermediate said drums, radial air passages through said ring assembly, air passages through said drums communicating freely with said passages through the ring assembly, and means for causing circulation of air outwardly through said passages when the clutch revolves, whereby heat is dissipated from said ring assembly by the air flowing outwardly through said passages, said means including curved fan blades on the periphery of the driving drum adjacent said air passages therethrough.

2. A clutch construction of the character described, including a driven drum having a side wall and an annular clutch ring supporting flange and a hollow interior, a driving drum having a ring supporting flange co-axial with said driven drum flange, said drums having transverse grooves, a friction ring assembly intermediate said flanges and supported in said grooves, said driven drum side wall having openings to let air into the interior thereof, said driven drum flange having openings through which air may flow from the interior of the driven drum to said grooves and to the ring assembly, said ring assembly having internal radial air passages communicating at their inner ends with the openings in said driven drum flange, said driving drum flange having apertures leading from the outer ends of said ring assembly air passages to the atmosphere, and means, including curved fan blades on the periphery of the driving drum, for causing air to flow from outside the clutch through the side wall of the driven drum into the interior thereof, and thence through said openings and air passages in said drum flanges and ring assembly, and thence discharging into the atmosphere, whereby the said parts of the clutch are cooled by said flow of air.

This specification signed this 26th day of September, 1925.

JOHN H. ALLEY.